United States Patent
Ohara

(10) Patent No.: US 7,933,036 B2
(45) Date of Patent: Apr. 26, 2011

(54) ELECTRIC APPLIANCE SETTING SYSTEM, IMAGE PROCESSING APPARATUS, ELECTRIC APPLIANCE, AND PROGRAM PRODUCT THEREFOR

(75) Inventor: Kiyotaka Ohara, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1247 days.

(21) Appl. No.: 11/535,325

(22) Filed: Sep. 26, 2006

(65) Prior Publication Data

US 2007/0068925 A1 Mar. 29, 2007

(30) Foreign Application Priority Data

Sep. 29, 2005 (JP) ................................. 2005-285327

(51) Int. Cl.
*G06F 3/12* (2006.01)
*G06F 15/16* (2006.01)
(52) U.S. Cl. ...................................... 358/1.15; 709/208
(58) Field of Classification Search ................... 358/1.1, 358/1.9, 1.13, 1.15, 402, 448; 707/3, 5; 705/26; 84/645; 715/513, 517, 530; 709/208, 223
See application file for complete search history.

(56) References Cited

U.S. PATENT DOCUMENTS

| | | | | |
|---|---|---|---|---|
| 2002/0049638 A1* | 4/2002 | Ito | ........................ | 705/26 |
| 2002/0107845 A1* | 8/2002 | Takahashi | ........................ | 707/3 |
| 2005/0125674 A1* | 6/2005 | Nishiki et al. | ........................ | 713/182 |
| 2005/0198566 A1* | 9/2005 | Takamine et al. | ........................ | 715/513 |
| 2005/0204902 A1* | 9/2005 | Shibukawa | ........................ | 84/645 |

FOREIGN PATENT DOCUMENTS

| | | |
|---|---|---|
| JP | H09-098252 A | 4/1997 |
| JP | H09-321934 A | 12/1997 |
| JP | H10-003709 A | 1/1998 |
| JP | H11-298500 A | 10/1999 |
| JP | 2001-169370 A | 6/2001 |
| JP | 2001-211284 A | 8/2001 |
| JP | 2001-346270 A | 12/2001 |
| JP | 2002-152456 A | 5/2002 |
| JP | 2002152456 A | 5/2002 |
| JP | 2002238081 A | 8/2002 |
| JP | 2002-330135 A | 11/2002 |
| JP | 2006-340242 A | 12/2006 |

OTHER PUBLICATIONS

Japanese Patent Office, Notification of Reasons of Rejection for Japanese Application No. 2005-285327, dated Jul. 15, 2008. (counterpart to above-captioned U.S. patent application).

* cited by examiner

*Primary Examiner* — Gabriel I Garcia
(74) *Attorney, Agent, or Firm* — Baker Botts L.L.P.

(57) ABSTRACT

An electric appliance setting system, comprising an image processing apparatus with an image scanning system, at least one electric appliance, which is communicably connected with the image processing apparatus through a network, is provided. The image processing apparatus includes a setting sheet print controlling system and a setting data transmission system. The at least one electric appliance includes a setting sheet data transmission system and a setting modifying system.

11 Claims, 9 Drawing Sheets

| DEVICE ID | ADDRESS | DEVICE NAME | EXPIRATION PERIOD | TIME STAMP |
|---|---|---|---|---|
| 987062622 | 192.168.11.34 | AA Company Refrigerator HR-23 | 30 days | 2005/09/07 12:15:03 |
| 245747670 | 192.168.11.53 | SS Company Plasma TV Vx-02 | 30 days | 2005/09/07 12:18:09 |
| 457245211 | 192.168.11.174 | HH Company Air Conditioner EX-45 | 30 days | 2005/09/07 12:16:48 |
| 56838245 | 192.168.11.66 | UU Company Water Heater Z-232 | 30 days | 2005/09/07 12:15:31 |

ELECTRIC APPLIANCE SETTING SYSTEM, IMAGE PROCESSING APPARATUS, ELECTRIC APPLIANCE, AND PROGRAM PRODUCT THEREFOR

CROSS REFERENCE TO RELATED APPLICATION

This application claims priority from Japanese Patent Application No. 2005-285327, filed on Sep. 29, 2005, the entire subject matter of which is incorporated herein by reference.

BACKGROUND

1. Technical Field

Aspects of the present invention relate to an electric appliance setting system, an image processing apparatus, an electric appliance and a computer program product therefor.

2. Related Art

Conventionally, an electric appliance setting system which is configured such that electric appliances such as a TV set, a VCR, a refrigerator and the like connected to a home network and are controlled using a PC, a facsimile machine and the like has been suggested. According to such a system, an operator of the PC or the facsimile machine can access the electric appliances via the home network, and apply various settings thereto.

An example of such a system is disclosed in Japanese Patent Provisional Publication No. P2002-238081A (hereinafter, referred to as '081 publication). According to the teachings of '081 publication, a server outside a home network accesses a PC connected to the home network, and makes various settings concerning operations of electric appliances through the PC based on the operation status of each electric appliance obtained by the PC and whether information obtained outside the home network.

SUMMARY

Aspects of the invention provide an improved electric appliance setting system which is advantageous in that the settings of the electric appliances can be made easier than conventional systems.

BRIEF DESCRIPTION OF THE ACCOMPANYING DRAWINGS

FIG. 1 schematically shows a configuration of an electric appliance setting system according to aspects of the invention.

DETAILED DESCRIPTION

General Overview

Figure 1:
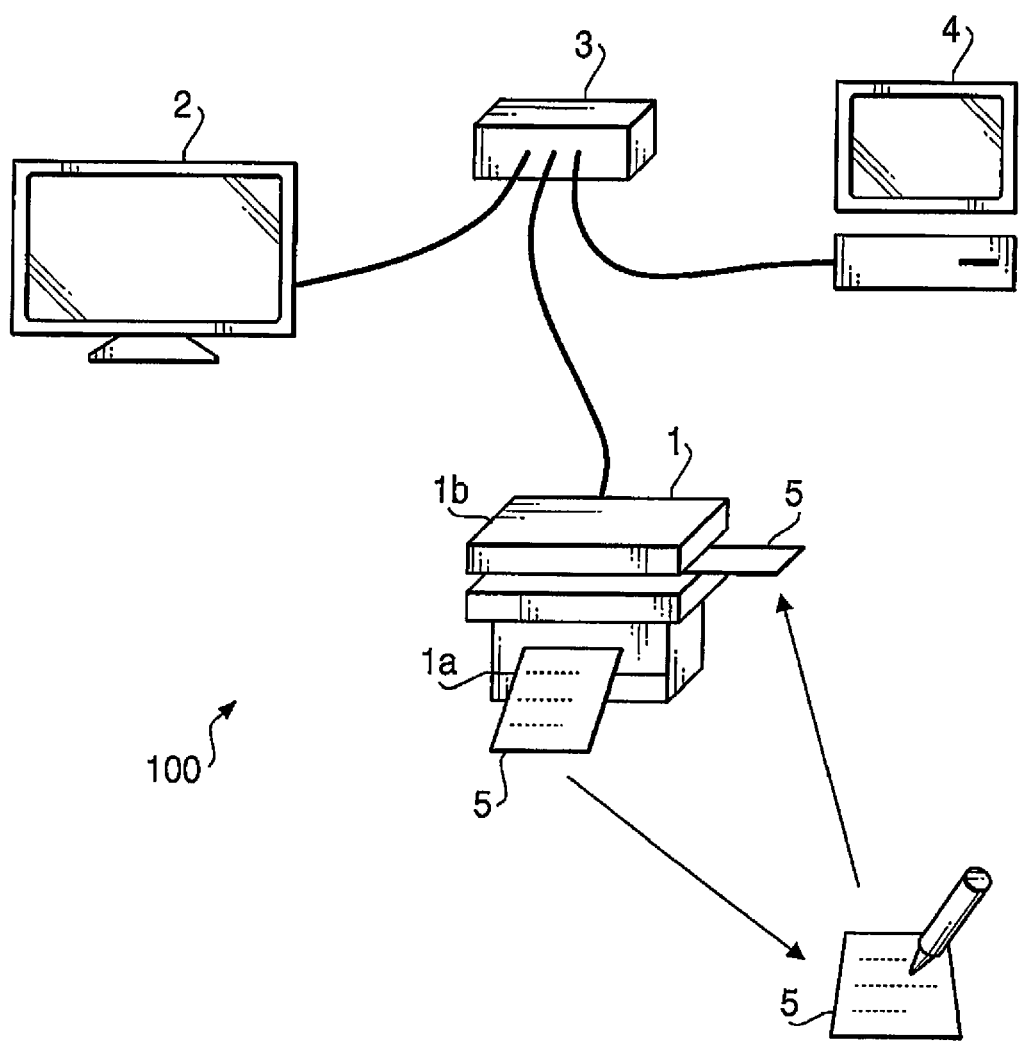

According to some aspects of the invention, there is provided an electric appliance setting system, comprising an image processing apparatus with an image scanning system which scans an image formed on an original document and an image printing system which prints an image, at least one electric appliance, which is communicably connected with the image processing apparatus through a network, wherein the image processing apparatus is provided with a setting sheet print controlling system, which controls the image printing system to form an image of a setting sheet, in which a desired setting of the at least one electric appliance is to be written by a user, based on setting sheet data transmitted from the at least one electric appliance to the image processing apparatus, and a setting data transmission system, which transmits setting data including one of image data scanned from the setting sheet with the desired setting written in by the user and data indicating the desired setting to the at least one electric appliance, and wherein the at least one electric appliance is provided with a setting sheet data transmission system which transmits the setting sheet data to the image processing apparatus and a setting modifying system which modifies a setting of the electric appliance to the desired setting written in the setting sheet by the user when the setting data is transmitted from the image processing apparatus.

According to the above configuration, the setting sheet is provided from the image processing apparatus so that the user can fill in the setting sheet to describe the desired setting of the electric appliance. Further, when the setting sheet with the desired setting written in is read by the image scanning system, data indicating the read image or data indicating the desired setting is transmitted to the electric appliance as the setting data. When the image read by the image scanning system is determined to be the setting data, the image is analyzed by the electric appliance so that the desired setting included in the image is extracted. When the data included in the image and indicating the desired setting written in by the user is determined to be the setting date, the image is analyzed by the image processing apparatus so that the desired setting is extracted to be the setting data. In either case, the desired setting included in the image is obtained by the electric appliance so that the setting of the electric appliance can be modified based on the setting data to the desired setting written in the setting sheet by the user.

With the above configuration, the user can set the electric appliance in a less complicated manner by filling the desired setting in the setting sheet and letting the image processing apparatus read the setting sheet with the desired setting written in to set the electric appliance without using an operation panel and various switches of the electric appliance.

The setting sheet is provided to the user from the image processing apparatus when the user actually sets the electric appliance, therefore, it can be prevented that the setting sheet is missing when needed and that the user cannot set the electric appliance due to loss of the setting sheet. In other words, the user can set the electric appliance without referring to an operation manual of the electric appliance, and it can be prevented that the user cannot set the electric appliance due to loss of the operation manual.

It should be noted that such a sheet as the setting sheet can be accompanied with the image processing apparatus when the image processing apparatus is purchased, however, such sheets may be lost, and in that case, the user cannot set the electric appliance. Thus, it is significant to provide the setting sheet from the image processing apparatus.

With the above configuration, various advantages regarding the setting sheet can be achieved. For example, the number of setting sheets the user can obtain is not limited, therefore, the user can modify the setting of the electric appliance as many times as desired. The user can also obtain a new setting sheet when one setting sheet is erroneously spoiled. It should be noted that setting items regarding the electric appliance may change as firmware of the electric appliance is updated. Even in such a case, a new setting sheet with the new setting items can be easily provided in accordance with the update of the firmware so that the latest version of setting sheet can be easily obtained.

Optionally, the image processing apparatus may be provided with a setting sheet data requesting system, which requests the at least one electric appliance to transmit the setting sheet data. The setting sheet data transmission system of the at least one electric appliance may transmit the setting sheet data to the image processing apparatus in response to the request from the image processing apparatus.

According to the above configuration, the setting sheet data is transmitted to the image processing apparatus according to the request from the image processing apparatus. Thus, unlike an electric appliance setting system wherein setting sheet data is compulsorily transmitted from the electric appliance regardless of the request from the image processing apparatus, the electric appliance can effectively transmit the setting sheet data to the image processing apparatus when the image processing apparatus is ready so that the network can be prevented from being unnecessarily loaded.

Optionally, the at least one electric appliance may be provided with a presence notifying system which notifies of presence of the at least one electric appliance itself in the network to the image processing apparatus. The setting sheet data requesting system of the image processing apparatus may request the at least one electric appliance that has notified of the presence to transmit the setting sheet data in response to the notification of the presence.

According to the above configuration, the image processing apparatus can detect the presence of the electric appliance by the notification from the electric appliance itself so that the image processing apparatus can be prevented from searching the electric appliance in the network periodically and the network as well as the image processing apparatus can be prevented from being unnecessarily loaded.

It should be noted that the presence notifying system can be configured to notify the presence of the electric appliance in the network by transmitting a predetermined packet to the image processing apparatus through the network. For example, the presence notifying system can transmit the predetermine packet by the image processing apparatus by multicast or broadcast. With this configuration, even when an address assigned to the image processing apparatus in the network is not known to the electric appliance, the electric appliance can still transmit the notification of presence to the image processing apparatus. It should be also noted that, if the electric appliance can obtain the address of the image processing apparatus (for example, by manual setting from the user or by information provided by another server), the predetermined packed can bee transmitted to the image processing apparatus by unicast.

Optionally, the presence notifying system of the at least one electric appliance may notify the image processing apparatus of the presence of the at least one electric appliance itself in the network when the at least on electric appliance is powered on.

According to the above configuration, the image processing apparatus can execute a predetermined process to provide the user with the setting sheet to lead the user to set the electric appliance properly when, for example, the electric appliance is initially installed in the network and turned.

Optionally, the presence notifying system of the at least one electric appliance may notify the image processing apparatus of the presence of the at least one electric appliance itself in the network at a predetermined time interval.

According to the above configuration, when the notification of presence cannot be received by the image processing apparatus for some reason in the image processing apparatus, another notification of presence can be received by the image processing apparatus when the image processing apparatus is ready so that a process to follow the receipt of the notification can be executed and the setting of the electric appliance can be completed properly.

Optionally, the image processing apparatus may be provided with an electric appliance data storing system, in which electric appliance data indicating the presence of the at least one electric appliance in the network can be stored, and an additional electric appliance judging system, which determines the at least one electric device that has notified of the presence of itself to the image processing apparatus is a newly added electric appliance which is newly connected to the network when the image processing apparatus being notified of the presence of the at least one electric appliance finds no electric appliance data corresponding to the at least one electric appliance that has notified of the presence of itself in the electric appliance data storing system. The setting sheet data requesting system of the image processing apparatus may request the newly added electric appliance to transmit the setting sheet data when the at least one electric appliance is determined to be the newly added electric appliance by the additional electric appliance judging system.

According to the above configuration, a process following the transmission of the setting sheet data can be applied only to the newly added electric appliance that is not yet registered in the electric appliance data storing system. Thus, only the newly added electric appliance that requires modification in setting more often can be applied the process following the transmission of the setting sheet data, and existing electric appliance that requires modification in setting less often can be prevented from the unnecessary process following the transmission of the setting sheet data so that the print media for the setting sheet should not be wasted.

Optionally, the image processing apparatus may be provided with an electric appliance data registering system, which stores the electric appliance data corresponding to the newly added electric appliance in the electric appliance data storing system when the at least one electric appliance is determined to be the newly added electric appliance by the additional electric appliance judging system.

According to the above configuration, the electric appliance data corresponding to the newly added electric appliance can be stored in the electric appliance data storing system when the newly added electric appliance is detected so that the user should not manually register the electric appliance data of the newly added electric appliance and the content of the electric appliance data storing system can be maintained updated in accordance with the component in the network.

Optionally, the image processing apparatus may be provided with an electric appliance data deleting system, which removes the electric appliance data corresponding to the electric appliance of which the presence in the network is not notified to the image processing apparatus over a predetermined period from the electric appliance data storing system.

According to the above configuration, invalid electric appliance data can be prevented from being unnecessarily maintained in the electric appliance data storing system so that a storage system (for example, a memory unit) of the image processing apparatus can be effectively used.

Optionally, the at least one electronic appliance may be provided with a modification information transmitting system, which transmits modification information indicating as to whether the setting of the at least one electric appliance has been modified before to the image processing apparatus. The image processing apparatus may be provided with an unset electric appliance judging system, which determines, based on the modification information transmitted from the at least one electric appliance, the at least one electric appliance of which the setting has not been modified before is an unset electric appliance. The setting sheet data requesting system of the image processing apparatus may request the unset electric appliance to transmit the setting sheet data when the at least one electric appliance is determined to be the unset electric appliance by the unset electric appliance judging system.

According to the above configuration, a process following the transmission of the setting sheet data can be applied only to the unset electric appliance. Thus, only the unset electric appliance that requires modification in setting more often can be applied the process following the transmission of the setting sheet data, and existing electric appliance that requires modification in setting less often can be prevented from the unnecessary process following the transmission of the setting sheet data so that the print media for the setting sheet should not be wasted. Further, when an additional image processing apparatus is installed in the network with the set electric appliance, the setting sheet for the set electric appliance can be prevented from being unnecessarily printed.

Optionally, the setting sheet data transmission system of the at least one electric appliance may transmit the setting sheet data including at least one of an address assigned to the at least one electric appliance in the network and a name identifying the address to the image processing apparatus. The setting sheet print controlling system of the image processing apparatus may control the image printing system to form the image of the setting sheet including an image indicating one of the address of the at least one electric appliance and the name identifying the address based on the setting sheet when the setting sheet data is transmitted from the at least one electric appliance.

According to the above configuration, an image indicating a dynamic address or a name that can be arbitrarily modified for some reason in the electric appliance can be printed as an image. Thus, the user is not required to select a destination address and a name of the electric appliance as a destination of the setting data and can be prevented from a selecting operation during the transmission of the setting data. Therefore, the setting data can be transmitted to the electric appliance as the destination securely.

According to some aspects of the invention, there is provided an image processing apparatus communicably connected to an electric appliance through a network, comprising an image scanning system which scans an image formed on an original document, an image printing system which prints an image on a recording medium, a setting sheet print controlling system, which controls the image printing system to form an image of a setting sheet, in which a desired setting of the electric appliance is to be written by a user, based on setting sheet data transmitted from the electric appliance to the image processing apparatus, and a setting data transmission system, which transmits setting data including one of image data read from the setting sheet with the desired setting written in by the user and data indicating the desired setting to the at least one electric appliance.

According to the above configuration, the image processing apparatus can operate in association with the electric appliance having the setting sheet data transmission system and the setting modifying system.

According to some aspects of the invention, there is provided a computer usable medium comprising computer readable instructions for controlling a computer which is communicably connected to an electric appliance via a network and has an image scanning system which scans an image formed on an original document and an image printing system which prints an image. The computer readable instructions control the computer to execute steps of controlling the image printing system to form an image of a setting sheet, in which a desired setting of the at least one electric appliance is to be written by a user, based on setting sheet data transmitted from the at least one electric appliance to the image processing apparatus, and transmitting setting data including one of image data scanned from the setting sheet with the desired setting written in by the user and data indicating the desired setting to the at least one electric appliance.

According to the above configuration, the computer can serve as the image processing apparatus that constitutes of the electric appliance setting system of the invention.

According to some aspects of the invention, there is provided an electric appliance, which is communicably connected to an image processing apparatus having an image scanning system that scans an image formed on an original document and an image printing system that prints an image on a recording medium, comprising a setting sheet data transmission system which transmits setting sheet data used by the image processing apparatus to form an image of a setting sheet, in which a desired setting of the electric appliance is to be written by a user to the image processing apparatus, and a setting modifying system which modifies a setting of the electric appliance to the desired setting written in the setting sheet by the user when the setting data including one of data indicating an image scanned from the setting sheet with the desired setting written in by the user and data indicating the desired setting included in the image scanned from the setting sheet is transmitted from the image processing apparatus.

According to the above configuration, the electric appliance can operate in association with the image processing apparatus having the setting sheet print controlling system and the setting data transmission system to constitute the electric appliance setting system of the invention.

According to some aspects of the invention, there is provided a computer usable medium comprising computer readable instructions for controlling a computer which is communicably connected to an electric appliance via a network and has an image scanning system which scans an image formed on an original document and an image printing system which prints an image on a recording medium. The computer readable instructions control the computer to execute steps of controlling the image printing system to form an image of a setting sheet, in which a desired setting of the at least one electric appliance is to be written by a user, based on setting sheet data transmitted from the at least one electric appliance to the image processing apparatus, and modifying a setting of the electric appliance to the desired setting written in the setting sheet by the user when the setting data including one of data indicating an image scanned from the setting sheet with the desired setting written in by the user and data indicating the desired setting included in the image scanned from the setting sheet is transmitted from the image processing apparatus.

According to the above configuration, the computer can serve as the image processing apparatus that constitutes of the electric appliance setting system of the invention.

Embodiment

Referring to the accompanying drawings, an electric appliance setting system according to aspects of the invention will be described.

Overall Configuration of Electric Appliance Setting System

FIG. 1 schematically shows an exemplary configuration of an electric appliance setting system 100 according to aspects of the invention.

The electric appliance setting system 100 includes an MFP 1, an electric appliance 2 and a PC (Personal Computer) 4, which are connected to a router 3. The MFP 1, the electric appliance 2 and the PC 4 can communicate with each other via the router 3.

The MFP 1 is implemented with multiple functions of a scanner, a printer, a copier, a facsimile machine and a telephone. Specifically, the MFP 1 is provided with an image recording unit 1a including a laser beam printer at a lower portion of its housing. When the printer function, the copier function or the facsimile reception function are used, the image recording unit 1a forms an image on a sheet-type recording medium. An upper portion of the housing of the MFP 1 is formed as an image reading unit 1b including an image scanner such as a flatbed scanner. When the scanner function, the copier friction, or the facsimile transmission function are used, an image on original sheets are read (scanned) by the image reading unit 1b.

The electric appliance 2 is a target device to which settings are applied (which will be described later). Although only one electric appliance 2 is shown in FIG. 1 for simplifying the figure, a plurality of electric appliances are generally included in the electric appliance setting system 100. Further, in FIG. 1, a TV set is shown as the electric appliance 2. This is only an example, and can be replaced with another electric appliance. Specifically, the electric appliance 2 may include a VCR, an HDD/DVD recorder, a video game device, a radio, a washing machine, a drying machine, an electric oven, an oven, a refrigerator, a rice cooker, an electric pot, a dish washing/drying machine, an air conditioner, a heater, a dehumidifier, a humidifier, an air cleaner, a lighting apparatus, a sewing machine, and the like. Further, the electric appliance 2 may be a device having a function similar to one or more of the functions of the MFP 1, or a device same as the MFP 1. Therefore, the electric appliance 2 may be an MFP, a facsimile machine, a telephone, a copier, an image scanner, and the like. In summary, the electric appliance setting system may include a plurality of electric appliances 2, which can be any one of the devices described above.

The router 3 is connected with each of the MFP 1, electronic appliance 2 and PC 4, and relays data transmitted thereamong from one to another. According to the embodiment, the router 3 has a time server function, a DHCP (Dynamic Host Configuration Protocol) server function and a name server function. Such server functions are utilized by the MFP 1, electric appliance 2 or the PC 4, which serve as clients. For example, each client (i.e., MFP 1, electric appliance 2 or PC 4) acquires a current time making use of the time server function of the router 3, thereby time settings among the device on the home network are synchronized. Further, each client (i.e., MFP 1, electric appliance 2 or PC 4) obtains network addresses on the home network of other devices making use of the DHCP server function of the router 3. Further, each client (i.e., MFP 1, electric appliance 2 or PC 4) performs a name resolution so that communication with a device designated by its name is enabled. It should be noted that the server functions described above need not be provided in one device. Each server function may be implemented to any one of the devices on the home network.

The PC 4 uses the MFP 1 as a default printer and a default scanner. In a process described later, the address of the PC 4 is set as a scan address for the MFP 1.

Exemplary Operation of Electric Appliance Setting System

Hereinafter, an exemplary operation of the electric appliance setting system will be described.

Figure 2:
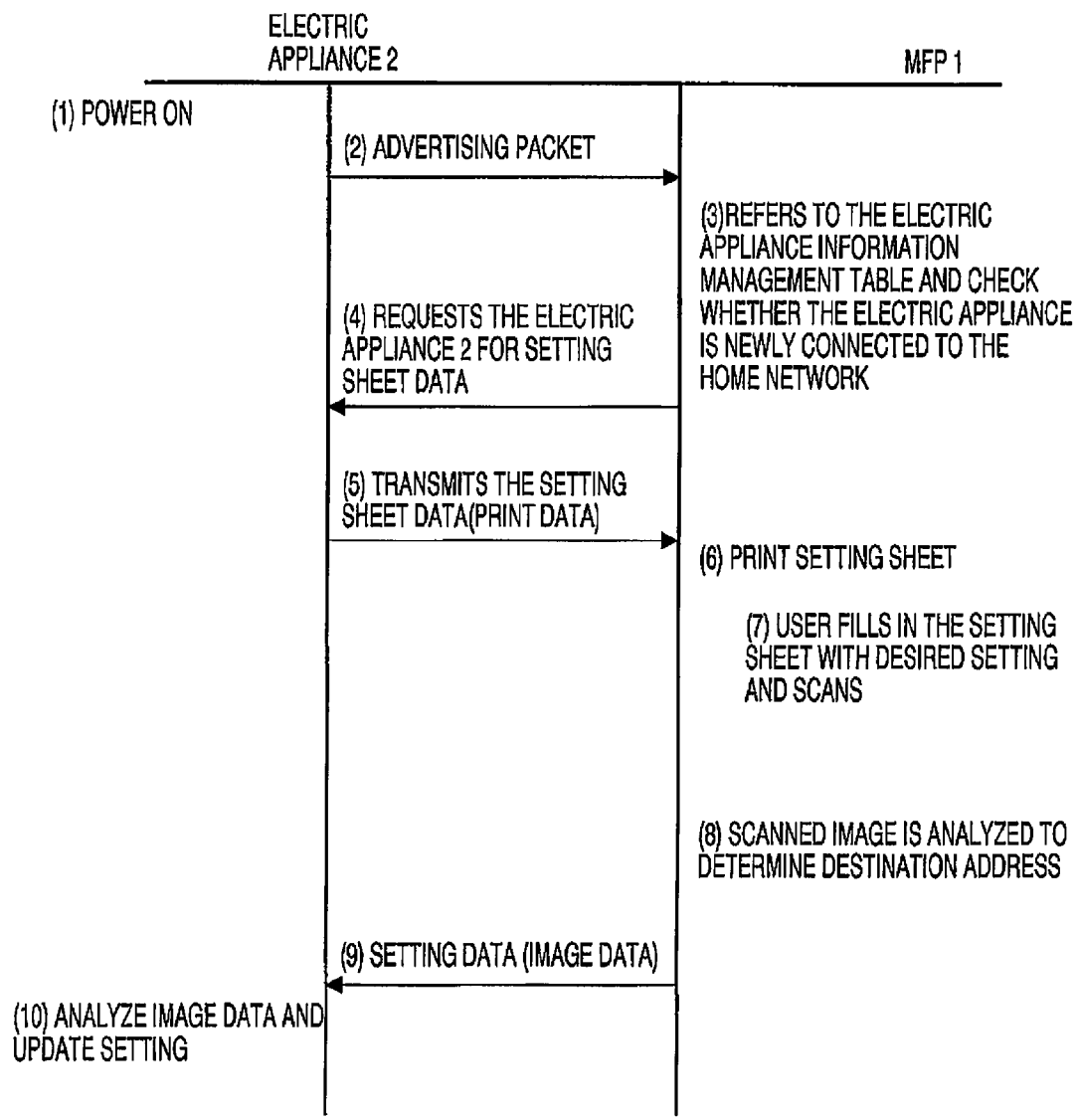
FIG. 2 is a timing chart illustrating an operation of the electric appliance setting system shown in FIG. 1.

FIG. 2 is a timing chart illustrating a data transmission procedure transmitted between the MFP 1 and the electric appliance 2, processes respectively executed by the MFP 1 and electric appliance 2, and operation performed by the user in a chronological manner. In this example, a newly purchased electric appliance 2 is connected to the home network and settings are made.

When the electric appliance 2 is connected to the home network, and the electric appliance 2 is powered ON (see FIG. 2, (1)), the electric appliance 2 transmits advertising packet into the home network by multicast, the advertising packet is transmitted from the electric appliance 2 to the MFP 1 (see FIG. 2, (2)). The advertising packet contains electric appliance data regarding the electric appliance 2 which transmits the advertising packet. Specifically, according to the exemplary embodiment, the electric appliance data includes information of a device name, an address, a set-completion flag, a device ID and an expiration period.

The device name is information enabling the user to recognize a plurality of electric appliances connected to the home network separately. According to the exemplary embodiment, the device name is defined as a combination of a manufacture's name, a type of the electric appliance (e.g., refrigerator, plasma TV, air conditioner, electric pot etc.), and its model number.

The address is information assigned to the electric appliance 2 so that a communication can be made with the electric appliance 2 through the home network. According to the exemplary embodiment, when the electric appliance 2 is firstly connected to the home network, the electric appliance 2 functions as the client and requests the DHCP server (i.e., the router 3) for the address, thereby the router 3 assigns the address to the electric appliance 2. It should be noted that the device name of the electric appliance 2 and the address assigned to the electric appliance 2 are stored with the name server (i.e., the router 3) in association with each other, and managed thereby. After registration, by sending a name resolution inquiry to the router 3, a device which sent the name resolution inquiry can obtain the address of the electric appliance 2.

The set-completion flag represents whether the settings of the electric appliance was made in the past. If the settings have not been performed, the flag is set to "0", otherwise, the flag is set to "1".

The device ID is a unique ID which has been determined so as not to overlap even if a plurality of electric appliances exist on the home network. A typical example of such an ID is a MAC address. Therefore, it is possible to use the MAC address as the device ID. It should be noted that any other ID prepared independently from the MAC address, as far as it is intrinsic to an individual electric appliance 2, can also be used as the device ID.

The expiration period represents a period of validity of the electric appliance data. As will be described later, the electric appliance data expiring the expiration period is, for example, deleted from a table.

When the MFP 1 receives the advertising packet including the electric appliance data, the MFP 1 refers to the electric appliance information management table and checks whether the electric appliance 2 is newly connected to the home network (hereinafter, such an electric appliance will be referred to as a new electric appliance). If the electric appliance 2 is a new electric appliance 2, the MFP 1 newly registers information regarding the new electric appliance 2 with the electric appliance information management table (see FIG. 2, (3)).

Figures 3, 4:
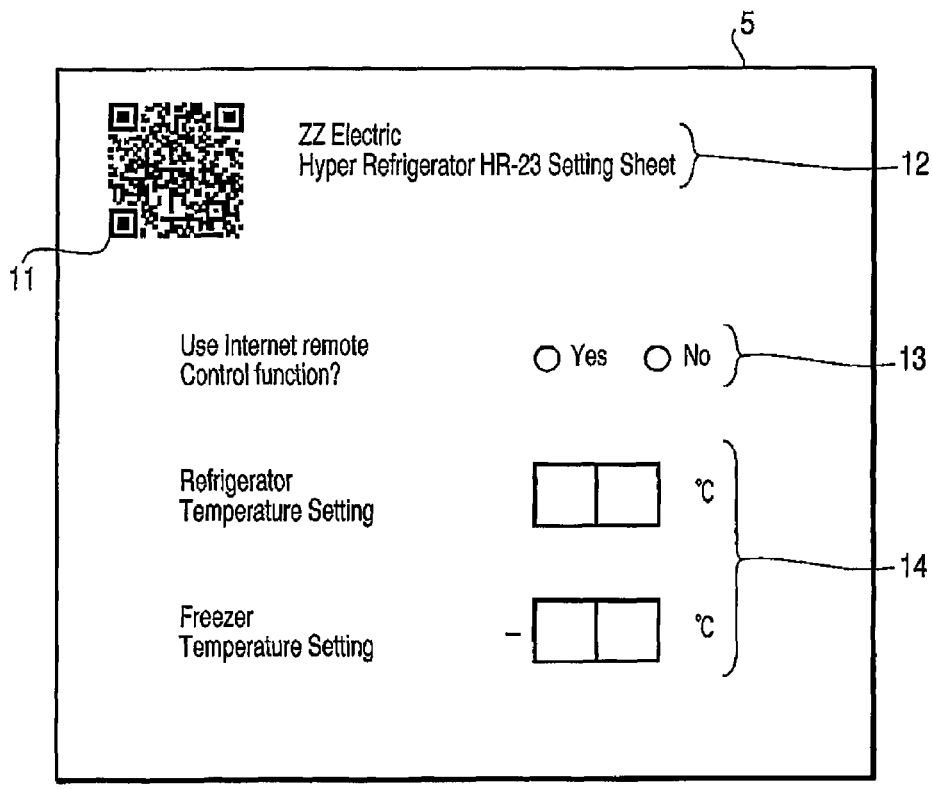
FIG. 3 shows a data structure of an electric appliance management table according to aspects of the invention.
FIG. 4 shows an example of a setting sheet according to aspects of the invention.

The electric appliance information management table is stored in an NVRAM (non-volatile RAM) provided to the MFP 1. The electric appliance information management table is configured such that the electric appliance information regarding plurality of electric appliances 2 can be registered therewith. FIG. 3 shows an exemplary data structure of the electric appliance information management table. As shown in FIG. 3, as the electric appliance data of each electric appliance 2, the device ID, the address, the device name, the expiration period and a timestamp can be registered.

The device ID, the address, the device name and the expiration period are included in the advertising packet received from the electric appliance 2. The timestamp represents a time at which the electric appliance information is registered with the table.

After registering the electric appliance information with the electric appliance information management table, the MFP 1 requests the electric appliance 2 for setting sheet data (see FIG. 2, (4)). In response to the request, the electric appliance 2 transmits the setting sheet data to the MFP 1 (see FIG. 2, (5)). When the setting sheet data is received, the MFP 1 print the setting sheet 5 (see FIG. 4) with the image recording unit 1a in accordance with the received setting sheet data, and discharges the same (see FIG. 2, (6)).

The setting sheet 5 is a printed material on which the user writes the settings for the electric appliance 2 with a pen. In the example shown in FIG. 4, a tessellated (two-dimensional) code 11, a title 12, marking section 13, writing section 14 are formed on the setting sheet 5.

The tessellated code 11 includes information indicating that the sheet is the setting sheet 5 and the address assigned to the electric appliance 2 that generated the setting sheet data of the setting sheet 5. In the example shown in FIG. 5, the tessellated code 11 includes encoded text information of <TYPE-B Company Device ConfigPage, URL HTTP://169.254.43.56/configpage_in>. In this example, a former half delimited by comma represents the information that the sheet is the setting sheet 5, and a character string <169.254.43.56> of a latter half is the address assigned to the electric appliance 2.

The address assigned to the electric appliance 2 (i.e., <169.254.43.56> in the example shown in FIG. 4) is an address obtained from the router 3. Therefore, the value is not intrinsic to the electric appliance 2, but a dynamic address which is determined when the electric appliance 2 is connected to the home network. Therefore, the text information including the address changes dynamically, and the tessellated code 11 also changes dynamically. Accordingly, even if the same electric appliance 2 is connected to the home network twice, the resultant tessellated codes 11 corresponding to respective connections will be different from each other.

In the exemplary embodiment, the tessellated code 11 is defined to include the address assigned to the electric appliance 2. Alternatively, the address may be replaced with a name from which the address of the electric appliance 2 can be identified. If such a name is included in the tessellated code 11, by performing the name resolution making use of the name server function of the router 3, the address of the electric appliance 2 can be identified.

The tile 12 is information for the user to recognize that the setting sheet 5 is for which one of the electric appliances 2 existing on the home network. In the example shown in FIG. 4, the title 12 includes text information indicating the manufacture's name, the product name and the model number.

The mark section 13 is configured such that the user can designate desired settings by filling in one of a plurality of circles. In the example shown in FIG. 4, the user can set whether the internet remote control function is made available or not.

The character writing section 14 is configured such that the user can designate settings by writing characters (numerals). In the example shown in FIG. 4, the user can write the temperature in a chill room and the temperature in a freezing room.

In the exemplary embodiment, the data of the tessellated code 11 is included in the setting sheet data transmitted from the electric appliance 2 to the MFP 1. Therefore, in the MFP 1, only by executing a printing operation in accordance with the setting sheet data, the tessellated code 11 can be printed. Alternatively, the MFP 1 may be configured to generate print data for the tessellated code 11. That is, if the dynamically changing portion in the tessellated code 11 only corresponds to the address of the electric appliance 1, the MFP 1, which has received the packet, can recognize the address by searching for a transmission source of the packet. Therefore, in such a configuration, the MFP 1 can collect the text information to be encoded into the tessellated code 11, and thus, the MFP 1 may generate the print data for the tessellated code 11.

When the setting sheet 5 described above is output from the image recording unit 1a, the user marks/writes the desired settings on the setting sheet 5. Then, the user sets the setting sheet 5 to the image reading unit 1b of the MFP 1, and operates an operation panel (not shown) of the MFP 1 to start a scanning operation (see FIG. 2, (7)).

When the scanning operation is executed, the MFP 1 analyzes the image data generated by the scanning to determine the destination address (see FIG. 2, (8)). This process will be described in detail later. It should be noted that, unless it is explicitly input through the operation panel that the transmitted data is not the data for the setting sheet 5, the MFP 1 analyzes the image data obtained by scanning. That is, the MFP 1 checks whether the data represents the image of the setting sheet 5, recognition of the mark positions and recognition of characters. If the MFP 1 recognizes the tessellated code 11 printed on the setting sheet 5 as a result of the analysis, the MFP 1 extracts the address indicated by the tessellated code 11 (strictly speaking, the destination is indicated by a URL (Uniform Resource Locator); in the example shown in FIG. 4, <http://169.254.43.56/configpage_in>).

After extracting the destination address, the MFP 1 transmits the setting data to the electric appliance 2 (see FIG. 2, (9)). According to the exemplary embodiment, the setting data is the image data of the setting sheet 5, which is generated by the scanning operation. In response to receipt of the setting data, the electric appliance 2 analyzes the image data (i.e., the setting data), obtains the setting parameters indicated therein, and updates the settings of the electric appliance 2 in accordance with the obtained setting parameters (see FIG. 2, (10)).

According to the exemplary embodiment, as described above, the image data is transmitted as the setting data from the MFP 1 to the electric appliance 2, the electric appliance 2 is required to analyze the image data. Alternatively, the MFP 1 may be configured to analyze the image data. That is, the MFP 1 may analyze the image data and generate text information (e.g., XML (eXtendible Markup Language)) data etc. Then, the MFP 1 may be configured to transmit the thus generated text data to the electric appliance 2 as the setting data.

According to the above procedure, on the electric appliance 2 side, the user can recognize the contents of the setting written on the setting sheet 5, the setting of the electric appliance 2 can be updated in accordance with the recognized setting values.

It should be noted that the above example illustrates a situation where the newly purchased electric appliance 2 is connected to the home network, and the settings to the electric appliance 2 are applied. As described later, in another process, the user can manually apply setting of the electric appliance 2. Further, in the above example, a series of procedures are started in response to power-ON of the electric appliance 2. In the process described later, the setting of the electric appliance 2 may be done in response to power-on of the MFP 1.

Process Executed by Electric Appliance and MFP

Next, a process executed by the electric appliance 2 and the MFP 1 in order to realize the electric appliance setting system described above will be described.

Electric Appliance Network Process

First, an electric appliance network process executed by the electric appliance 2 will be described, referring to FIG. 5.

Figure 5:
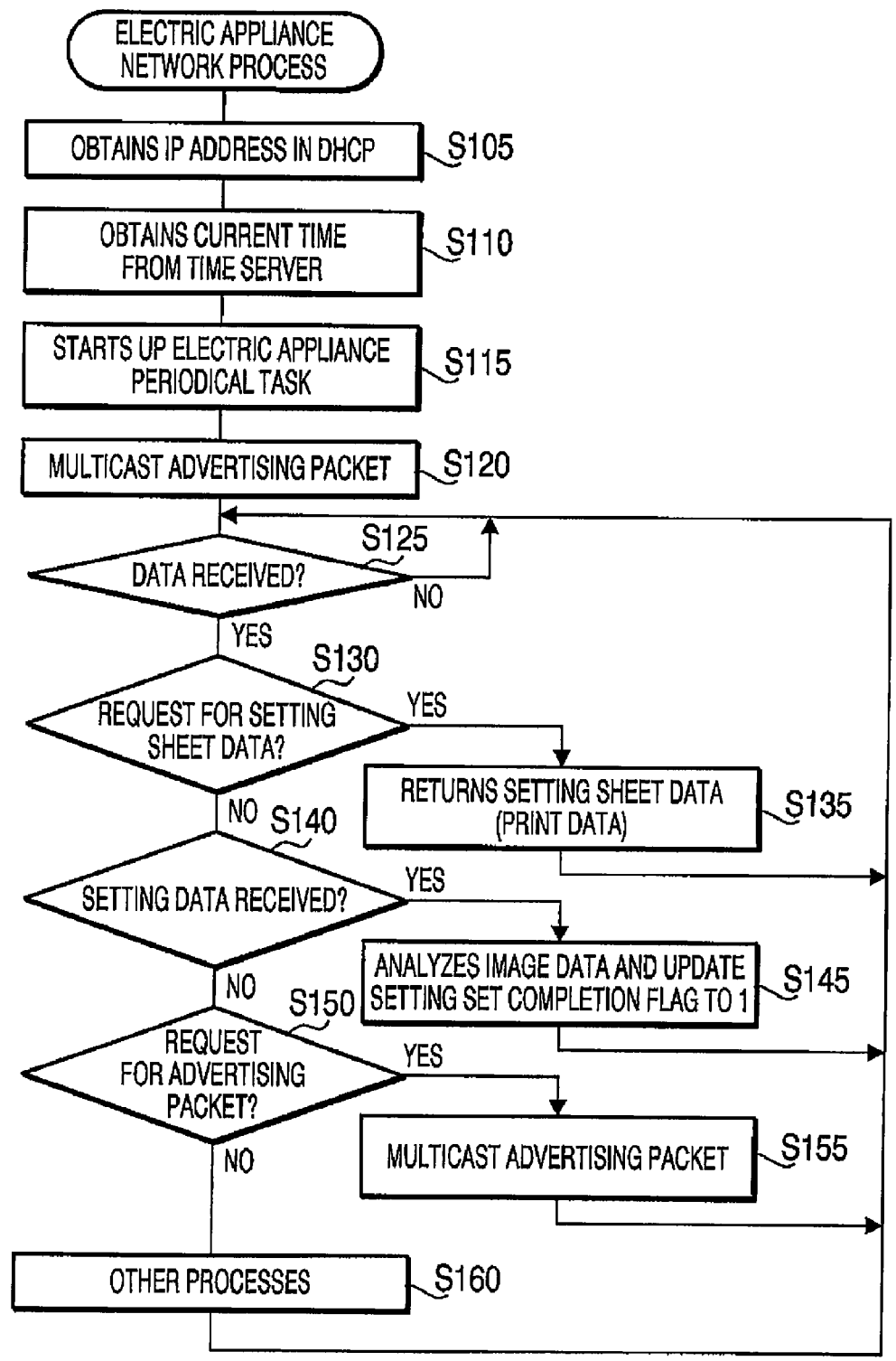
FIG. 5 is a flowchart illustrating an electric appliance side network process according to aspects of the invention.

FIG. 5 shows a flowchart illustrating the electric appliance network process, which is executed by the electric appliance 2 when connected to the home network and is powered ON.

When the electric appliance network process is started, the electric appliance 2 makes use of the DHCP server function of the router 3, and obtains the IP address the router 3 has assigned to the electronic alliance 3 from the router 3 (S105). Then, in S110, the electric appliance 2 makes use of the time server function of the router 3, and obtains the current time from the router.

Next, the electric appliance 2 starts up the electric appliance periodical task (S115). The electric appliance periodical task is a process executed by the electric appliance 2 in parallel with the electric appliance network process. The electric appliance periodical task will be described later.

In S120, the electric appliance 2 multicasts the advertising packet. The advertising packet includes the electric appliance data, which includes the device name, the address, the setting-completion flag, the device ID, the expiration period and the like. The advertising data multicast in S120 corresponds to the packet, which is determined to be received in S320 of the MFP network process (see FIG. 7), which will be described later.

After execution of S120, the electric appliance 2 judges whether there is received data (S125). Until some data is received, the electric appliance 2 repeats S125.

If the electric appliance 2 has received some data (S125: YES), whether a request for the setting sheet data is received is judged (S130). If the electric appliance 2 has received the request for the setting sheet data (S130: YES), it transmits the setting sheet data to the MFP 1 (S135). As described above, the setting sheet data is the print data for the MFP 1 to print the setting sheet 5. In S135, the electric appliance 2 dynamically generates the setting sheet data including data of the tessellated code 11, the title 12, the marking section 13 and the writing section 14, referring to the address assigned to the electric appliance. Then, the print data is transmitted, as the setting sheet data, from the electric appliance 2 to the MFP 1. After execution of S135, the process returns to S125.

If the electric appliance 2 has not received the request for the setting sheet data (S130: NO), the electric appliance 2 judges whether the setting data has received (S140). If the setting data has been received (S140: YES), the electric appliance 2 executes analysis of the image data, which has been transmitted as the setting data (S145). That is, the electric appliance 2 checks whether the received data is the scan data of the setting sheet 5, recognizes the mark positions, and recognizes the characters. Then, the electric appliance 2 extracts the setting values included in the received setting data, and updates the settings of the electric appliance 2. Thereafter, the electric appliance 2 sets the setting completion flag to 1. By executing S145, the settings of the electric appliance 2 have been updated. Since the setting completion flag, which the electric appliance 2 retains, has been set to 1, when the electric appliance 2 transmits the advertising packet, the value of the setting completion flag will be indicated as one. After execution of S145, the process returns to S125.

If the setting data has not been received (S140: NO), the electric appliance 2 judges whether a request for the advertising packet has been received (S150). If the request for the advertising packet has been received (S150: YES), the electric appliance 2 multicasts the advertising packet (S155). After execution of S155, the process returns to S125.

If the request for the advertising packet has not been received (S150: NO), the electric appliance 2 executes other processes (S150). Since such processes are not essential in view of the present invention, description thereon will be omitted for brevity. After execution of S160, the process returns to S125.

By executing the electric appliance network process, the electric appliance 2 monitors the data received from the MFP 1, and executes a process corresponding to the received data.

Electric Appliance Periodical Task

Figure 6:
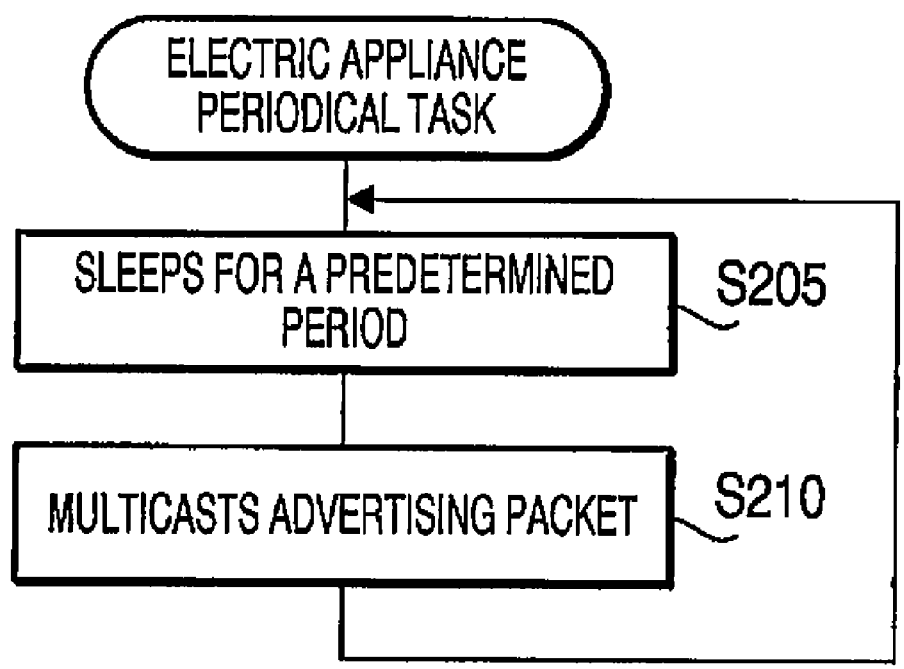
FIG. 6 is a flowchart illustrating an electric appliance side periodical task according to aspects of the invention.

FIG. 6 is a flowchart illustrating the electric appliance periodical task, which is executed in S115 of the electric appliance network process.

When the electric appliance periodical task is started, steps S205 through S210 are repeated, and at every predetermined period, the advertising packet is multicast. With this process, even if a situation where the MFP 1 has not been operating for a certain period after the electric appliance 2 was started up, when the MFP 1 starts up thereafter, the advertising packet is multicast during the repetition of steps S205-S210, and it is ensured that the MFP 1 receives the advertising packet.

MFP Network Process

Figure 7:
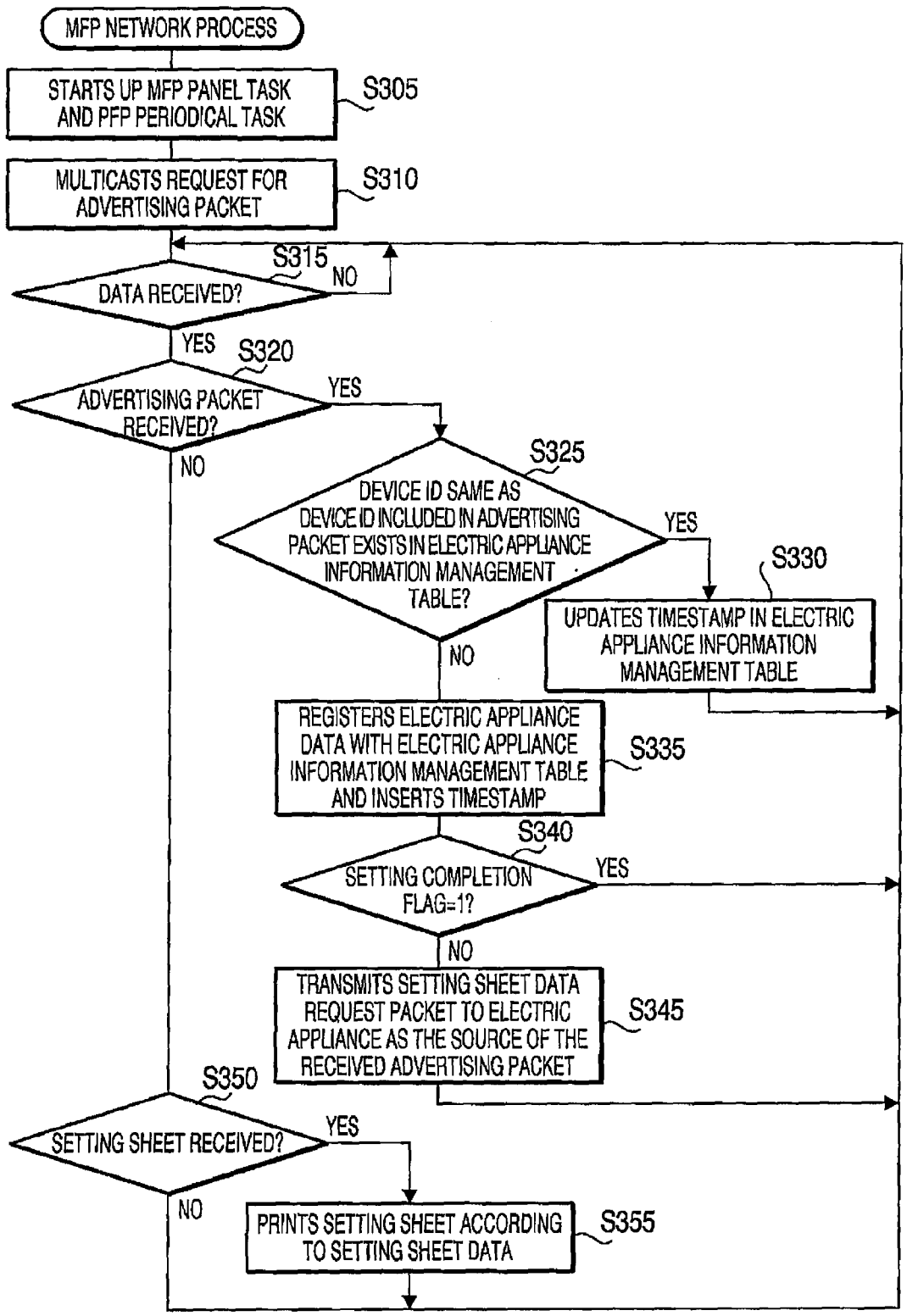
FIG. 7 is a flowchart illustrating an MFP (multiple function peripheral) side network process according to aspects of the invention.

FIG. 7 is a flowchart illustrating an MFP network process executed by the MFP 1. When the MFP 1 is powered ON with the MFP 1 being connected to the home network, the MFP network process is started.

When the MFP network process is started, the MFP 1 starts up the MFP panel task and MFP periodical task (S305). The MFP panel task and the MFP periodical task are executed in parallel with the MFP network process by the MFP 1. The MFP panel task and the MFP periodical task will be described later.

Next, the MFP 1 multicasts a request for the advertising packet (S310). The request for the advertising packet is the request, which is determined to be received in S150 of the electric appliance network process (see FIG. 5). As the request for the advertising packet is multicast in such a timing, when the electric appliance 2 was connected to the home network first and then the MFP 1 was connected to the home network, the connection of the MFP 1 to the home network can be notified to the electric appliance 2.

After execution of S310, the MFP 1 judges whether there exists received data (S315). If not data has been received (S315: NO), the process repeats S315 until some data is received.

If some data has been received (S310: YES), the MFP 1 judges whether the advertising packet has been received (S320). If the advertising packet has been received (S320: YES), the MFP 1 judges whether a device ID same as the device ID included in the advertising packet is included in the electric appliance information management table (see FIG. 3) in S325.

If the device ID same as that included in the received advertising packet is included in the electric appliance information management table (S325: YES), it is know that the electric appliance is not the first electric appliance 2 newly conducted to the home network. In such a case, the MFP 1 simply updates the timestamp in the electric appliance information management table (S330). For example, if the MFP 1 retains the electric appliance information management shown in FIG. 3, and if the device ID included in the received advertising packet is "987062622", since the same device ID is included in the electric appliance information management table, the MFP 1 recognizes that the NN company's refrigerator HR-23 is not the electric appliance 2 newly introduced in the home network. In this case, the MFP 1 updates only the timestamp in the electric appliance information management table corresponding to the device ID. After execution of S330, the process returns to S315.

If the electric appliance information management table does not include the device ID same as the received device ID (S325: NO), the electric appliance 2 is determined to be one newly introduced in the home network (or the electric appliance whose expiration period has elapsed: which will be described later). In such a case, the MFP 1 newly registers the electric appliance data included in the advertising packet with the electric appliance information management table, and inserts the timestamp in the registered information (S335). Next, the process judges whether the setting completion flag included in the advertising packet is one (S340). If the setting completion flag is not one (S340: NO), the process transmits a setting sheet data request packet to the electric appliance 2 that is the source of the received advertising packet (S345), and process returns to S315. If the setting completion flag is one (S340: YES), the process skips S345, and returns to S315. The setting sheet data request packet output in S345 is determined to be received in S130 of the electric appliance network process (see FIG. 5).

It should be noted that S340 is executed so that the setting sheet data request will not be transmitted to the electric appliance 2 if a setting of the electric appliance 2 has already been done even if the electric appliance 2 is not registered with the electric appliance information management table. With this process, when the setting of the electric appliance have been made, unnecessary output of the setting sheet 5 by the MFP 1 can also be avoided.

The process may determine that the advertising packet has not been received (S320: NO). In such a case, the MFP 1 judges whether the setting sheet data has been received (S350). IF the setting sheet data has been received (S350: YES), the MFP 1 prints out the setting sheet 5 in accordance with the setting sheet data (S355). That is, the setting sheet 5 is printed and output by the image recording unit 1$a$ of the MFP 1. After execution of S355, the process returns to S315. If the process determines that the setting sheet data has not been received (S355: NO), the process returns to S315.

By executing the MFP network process, the MFP 1 monitors the data transmitted from the electric appliance 2, and executes a process corresponding to the received data.

MFP Panel Task

Figure 8:
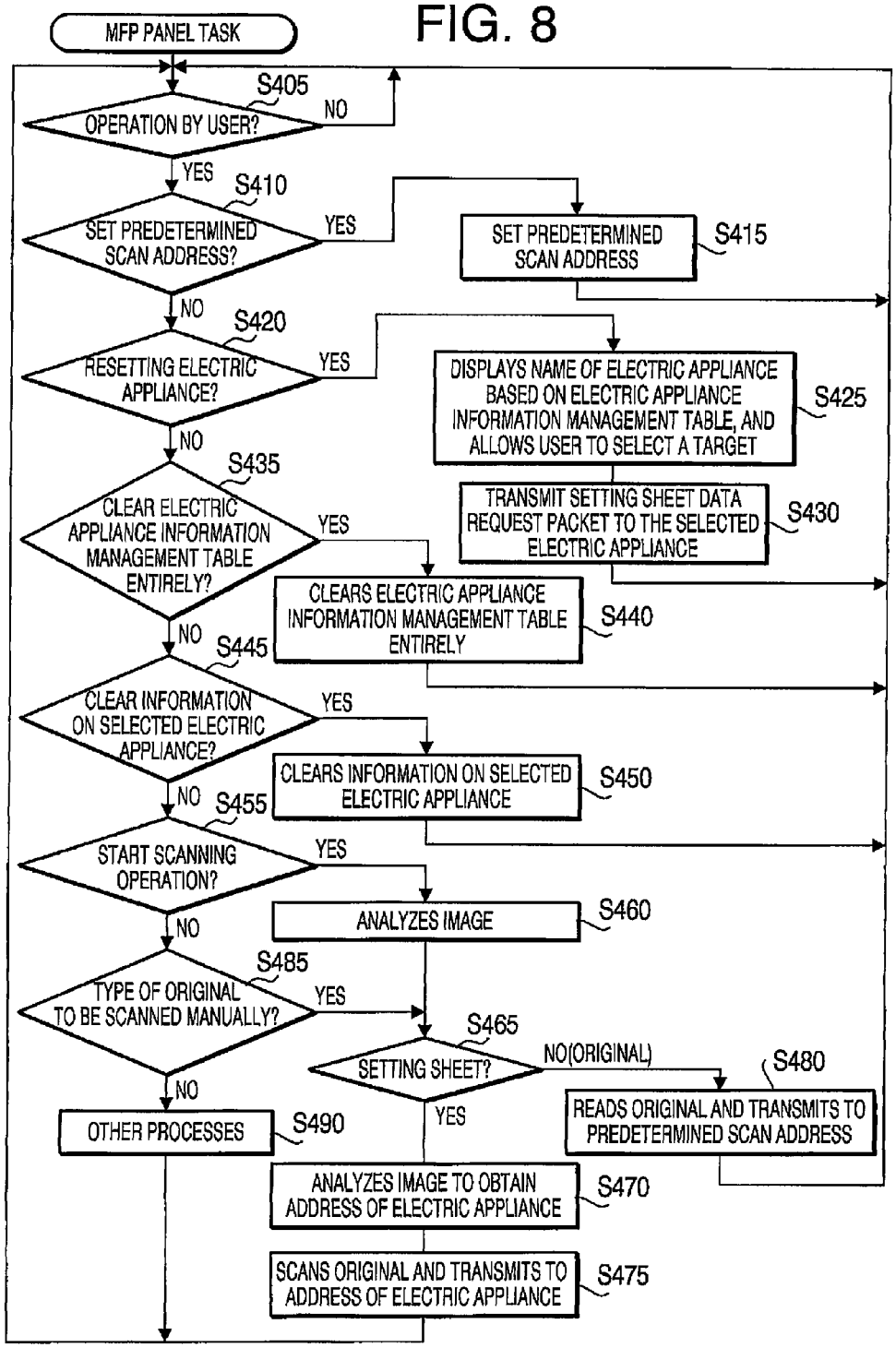
FIG. 8 is a flowchart illustrating an MFP panel task according to aspects of the invention.

FIG. 8 is a flowchart illustrating the panel task executed in S305 by the MFP 1.

When the MFP panel task is started, the MFP 1 judges whether an operation by the user has been made to the MFP 1 (S405). If the user operation has not been made (S405: NO), the process returns to S405 and waits for the user operation.

If the user operation has been made (S405: YES), the process judges whether the user operation is to set a predetermined scan address (S410). If the operation is to set the predetermined scan address (S410: YES), the process sets the predetermined scan address (S415), and returns to S405. The predetermined scan address is an address selected as a destination address when the type of the scanned sheet is not the setting sheet. The type of the scanned sheet is analyzed in S460 (described later) or designated by the user in S485 (described later). The predetermined scan address is used in S480.

If the process determines that the operation is not to set the predetermined scan address (S410: NO), the process judges whether the operation is to instruct resetting of the electric appliance (S420). The operation of electric appliance resetting is an operation where the user arbitrarily selects an electric appliance 2 from among the electric appliances 2 registered with the electric appliance information management table (see FIG. 3) contained in the MFP 1, and make the MFP 1 to print out the setting sheet 5 necessary for setting the selected electric appliance 2.

Figure 9:
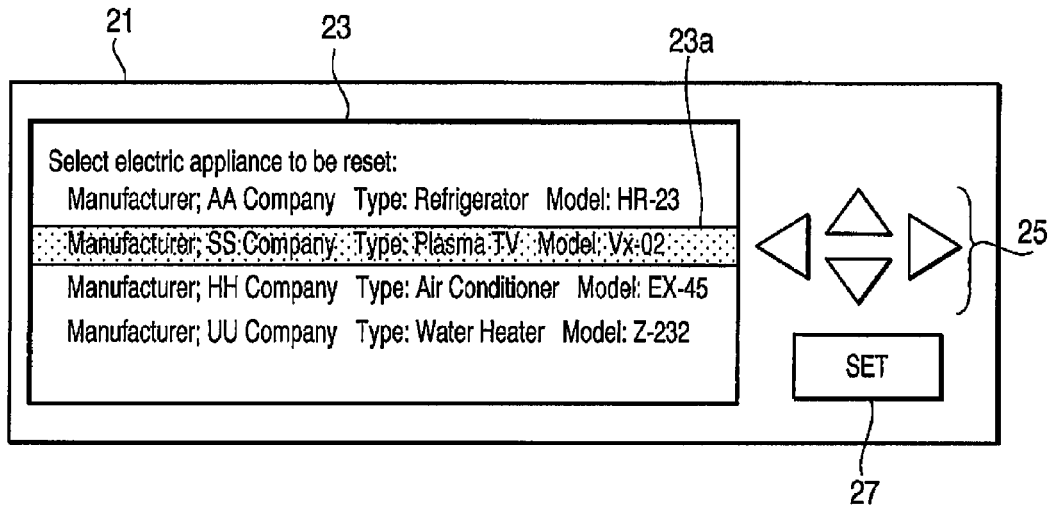
FIG. 9 shows an operation panel of the MFP when a target electric appliance for resetting is selected.

If the user operation is to reset the electric appliance 2 (S420: YES), the MFP 1 displays the name of the electric appliance and the like base on the information registered with the electric appliance information management table, and allows the user to select a target electric appliance 2 of which the settings are reset (S425). The MFP 1 is provided with an operation panel 21 as shown in FIG. 9. On the operation panel 21, an LCD (liquid crystal display) 23, direction keys 25, set key 27 and the like are provided. In S425, the names of the electric appliance 2 and the like are displayed on the LCD 23, and the user moves a focus 23$a$ onto an intended electrical appliance 2 by operating the direction keys 25. Then, by depressing the set key 27, the intended electric appliance 2 on which the focus 23$a$ is located is selected.

When the user selects the intended electric appliance 2 (S425), the MFP 1 transmits the setting sheet data request packet to the selected electric appliance 2 (S430), and the control returns to S405. The setting sheet data request packet transmitted in S425 is the request determined to be received in S130 of the electric appliance network process (see FIG. 5).

If the process determines that the operation is not the instruction to reset the electric appliance 2 (S420: NO), the MFP 1 judges whether the user operation is to clear the electric appliance information management table entirely (S435). If the user operation is to clear the electric appliance information management table entirely (S435: YES), the MFP 1 clears the electric appliance information management table entirely (S440), and returns to S405. When S440 is executed, all the information stored in the electric appliance information management table is deleted.

Figure 10:
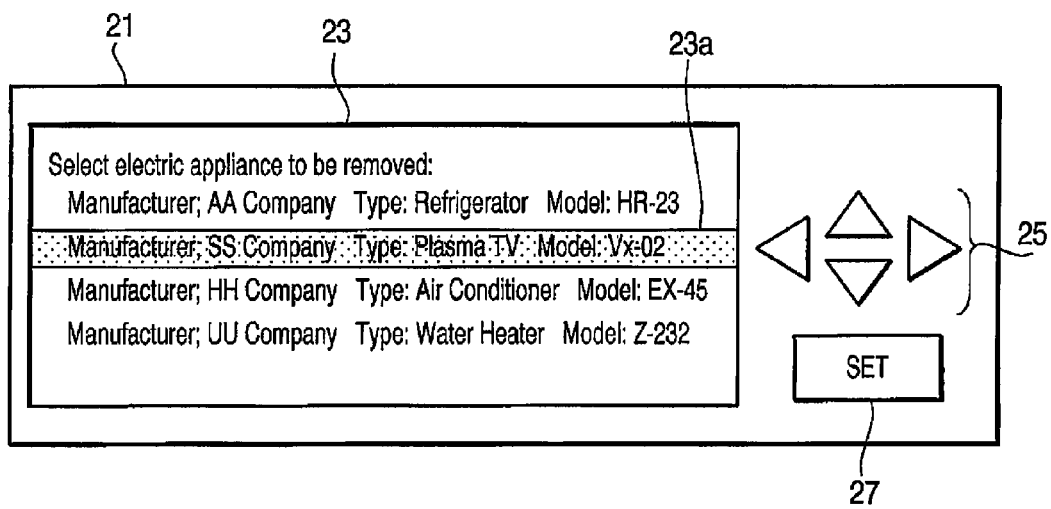
FIG. 10 shows the operation panel of the MFP when a target electric appliance for deletion is selected.

If the process determined that the operation is not the instruction to clear the electric appliance information management table entirely (S435: NO), the process determines whether the operation is to clear information concerning the selected electric appliance 2 that is selected by the user from the electric appliance information management table (S445). If the operation is to clear the information concerning the selected electric appliance 2 (S445: YES), the process selectively clears the electric appliance information management table (S450). When S450 is executed, as shown in FIG. 10, the names of the electric appliance 2 and the like are displayed on the LCD 23, and the user moves the focus 23a onto an intended electrical appliance 2 by operating the direction keys 25. Then, by depressing the set key 27, the intended electric appliance 2 on which the focus 23a is located is selected. As a result of the above operation, the information on the selected electric appliance 2 is deleted from the electric appliance information management table (S450). Thereafter, the process returns to S405.

If the process determines that the user operation is not for select the electric appliance 2 and deleted the information (S445: NO), the process judges whether the operation is to start the scanning operation (S455). If the operation is to start the scanning operation (S455: YES), the process analyzes the image and the scanned sheet is the setting sheet 5 (S460). Specifically, when S460 is executed, the process judges whether the tessellated code 11 is included in the image. If there is the tessellated code 11 in the image, the process judges whether the tessellated code 11 includes information indicating that the sheet is the setting sheet 5. If the tessellated code 11 includes the information indicating that the sheet is the setting sheet 5, the process determines that the sheet is the setting sheet 5. If the image does not include the tessellated code 11 or the tessellated code 11 is included but the information indicating the setting sheet 5 is not included in the tessellated code 11, the process determines that the sheet is not the setting sheet 5.

If the process determines that the sheet is the setting sheet 5 (S465: YES), the MFP 1 analyzes the image and obtains the address of the electric appliance 2 (S470). According to the illustrative embodiment, the tessellated code 11 is configured to include the address (strictly speaking, included ins an URL representing a destination of the setting sheet 5; in the example shown in FIG. 4, <http://169.254.43.56/configpage_in>), and the MFP 1 obtains this address (URL). Then, the MFP 1 reads the original (i.e., the setting sheet 5) to generate an image data thereof, which is transmitted to the address of the electric appliance 2 as the setting data therefor (S475). After execution of S475, the process returns to S405. The setting data (image data) transmitted in S475 is the data determined to be received in S140 of the electric appliance network process (see FIG. 5).

If the process determines that the sheet is not the setting sheet 5 (S465: NO), the process reads the original, which is not the setting sheet 5, to generate image data, which is transmitted to the scan address (i.e., the destination address set in S415) in S475. Thereafter, the process returns to S405.

Steps S460-S480 represent a process diverged at S455 where the process determined that the operation is to start the scanning operation. These steps correspond to a process of starting the scanning operation without a user's designation of the type of the original. According to the illustrative embodiment, prior to the scanning of the original, the user may designate the type of the original to be scanted.

Figure 11:
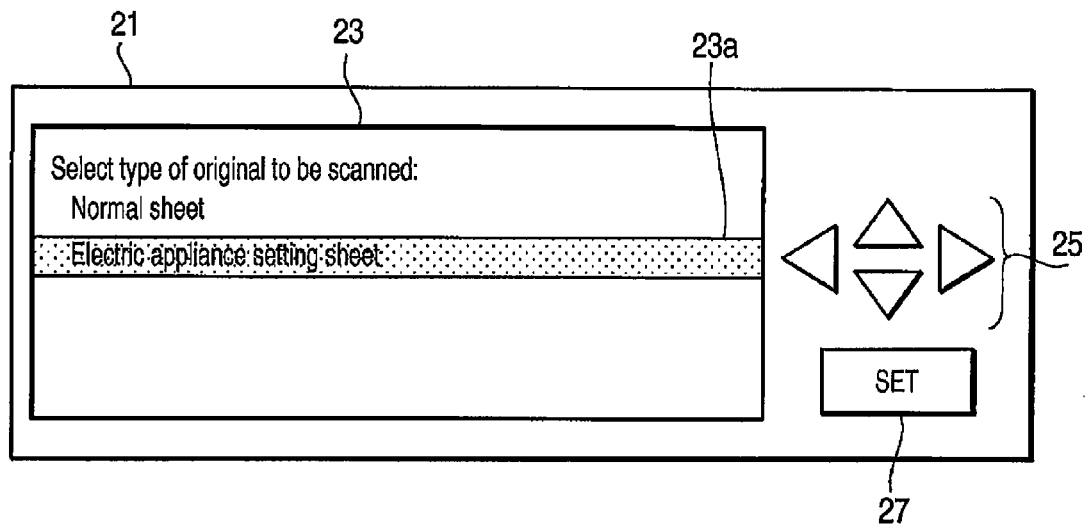
FIG. 11 shows the operation panel of the MFP when a type of sheets for scanning is selected.

If the process determines that the user operation is not an operation to start scanning (S455: NO), the process judges whether the user operation instructs to select the type of the original to be scanned manually (S485). If the operation is to select the type of the original to be scanned manually (S485: YES), as shown in FIG. 11, selectable options (e.g., "normal sheet" and "electric appliance setting sheet") are displayed on the LCD 23. Then, the user moves the focus 23a onto an intended option by operation the direction keys 25, and select the focused option by depressing the set key 27 to select the type of the original to be scanned. As a result, the type of the original is determined, and process proceeds to S465. In S465, the process judges whether the type of the manually selected original is the setting sheet 5. Depending on the result of the judgment in S465, process diverges to S470-S474 or S480. By executing the manual selection of the sheet type, when the setting sheet 5 is scanned, it is possible to transmits the image data representing the setting sheet 5 to the predetermined scan address (e.g., PC4) by selecting the "normal sheet" setting.

If the user operation is not the operation to manually select the type of the original to be scanned (S485: NO), the MFP 1 executes other processes (S490), and returns to S405. The other processes may include various process, which are not essential to the present invention and description thereon is omitted for brevity. By executing the MFP panel task described above, the MFP 1 executes a process corresponding to the operation made by the user.

MFP Periodical Task

Figure 12:
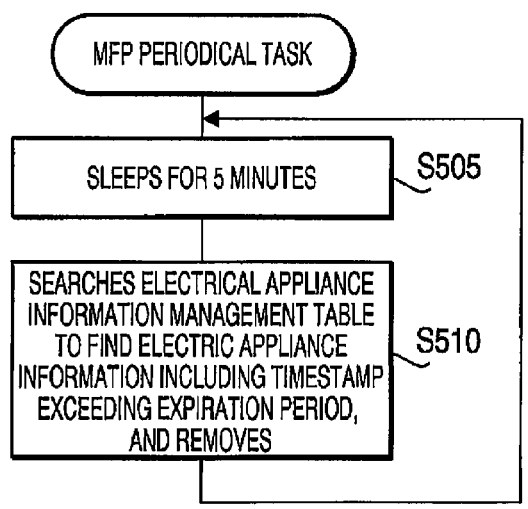
FIG. 12 is a flowchart illustrating an MFP side periodical task according to aspects of the invention.

FIG. 12 is a flowchart illustrating the MFP periodical task, which is executed in S305 of the MFP network process.

When the MFP periodical task is executed, the MFP 1 maintains a sleeping condition for five minutes (S505), and then, searches the electric appliance information management table to find electric appliance information including the timestamp that exceeds the expiration period. Such information will be deleted from the electric appliance information management table (S510), and the process returns to S505.

If the electric appliance 2 is operating with being connected to the home network, by execution of S120, S155 or S210, the advertising packet is multicast periodically or irregularly. Therefore, the MFP 1 determines that the advertising packet is received (S320: YES), the S330 or S335 will be executed. As a result, the timestamp included in the information registered with the electric appliance information management table is newly registered in the table (S335), and updated periodically or irregularly in S330.

Thus, if the electric appliance 2 operates as being connected to the home network. Therefore, the timestamp included in the information registered with the electric appliance is updated periodically or irregularly. If the electrical appliance 2 is connected to the home network but does not operate for a certain period, the information regarding such an electric appliance 2 is removed form the electric appliance information management table.

It should be noted that in the electric appliance information management table, the expiration period is different in individual electric appliance 2, even if the timestamp indicates the old data, the data will not be deleted.

For example, in the electric appliance information management table shown in FIG. 3, the expiration period of the air conditioner is 365 days, which is relatively longer than the other appliances (e.g., refrigerator, plasma TV and pot) whose expiration periods are 30 days. In such an example, if the air conditioner has not been operated for a certain period, the information thereof will not be removed from the electric appliance information management table. With such a configuration, even if the air conditioner has not been operated for a relatively long period (e.g., several months), the information thereof may not be deleted easily. Therefore, when such an electric appliance is used again, the setting sheet will not be unnecessarily output.

For another example, if a relatively short expiration period is set for the electrical appliances 2, which may be used relatively frequently (e.g., refrigerator, plasma TV, pot), when the appliances are renewed by purchase and old appliances are not used, the information for the old devices may be deleted timely, and unnecessary information will not be retained in the electric appliance information management table for a unnecessarily long period.

According to the electric appliance setting system described above, when the setting of the electric appliance 2 is made, the user is required only to write the desired setting on the setting sheet 5, and have the MFP 1 read the setting sheet 5. Therefore, in comparison with a case where the user is required to operate various switches/operation panels, the setting can be made relatively easily.

Further, since the setting sheet 5 is printed out by the MFP 1 when the user intends to make/change the settings, the setting sheet 5 will not be lost, and a situation where the user cannot change the setting due to missing of the setting sheet 5 will not occur. Since it is not necessary to refer to a manual to change the setting of the electric appliances, or since the setting sheet is not supplied as the attached sheet, there is no possibility of losing the same, and the user can change the settings any time when desired/necessary.

According to the electric appliance setting system configured as above, since the setting sheet 5 is printed out, the user can obtain a necessary number of the setting sheets 5. Therefore, different from a case where a limited number of setting sheets are preliminarily attached, the user can change the settings by any number of times. Even if there is an error in writing the settings on the setting sheet, the user can obtain a new setting sheet easily.

According to the electric appliance setting system described above, if firmware and the like are replaced for fixing/maintenance, the setting items may be changed. Since the setting sheet 5 is printed out, it is relatively easy to change the contents of the setting sheet to meet the renewed setting items. Therefore, in comparison with a case where the setting sheets 5 are attached to the electric appliance 5, the setting sheet 5 completely corresponding to the latest firmware can be obtained easily.

According to the electric appliance setting system described above, as the MFP 1 executes step S345 and the setting sheet data is transmitted in response to the request by the MFP 1. Therefore, the setting sheet data is always transmitted when the MFP 1 is in condition for receiving such data. Therefore, the setting sheet 5 can be transmitted to the MFP 1 without applying unnecessary load to the home network.

According to the electric appliance setting system described above, even if the MFP 1 searches for the electrical appliances 2, the MFP 1 can recognize existing electric appliances 2 as they execute processes of S120 or S210 and transmit the advertising packets. Therefore, the MFP 1 need not search for the existing electric appliances 2 periodically, and load to the home network can be reduced.

According to the electric appliance setting system described above, since the electric appliances 2 execute S120, existence of the electric appliance 2 is notified to the MFP 1 simply by powering on the electric appliance 2. This configuration is particularly convenient when a new electric appliance 2 is introduced in the home network. That is, by connecting the new electric appliance 2 and powering on the same, the MFP 1 immediately receive the advertising packet and executes following processes appropriately, and desired changes in settings can be completed easily.

According to the electric appliance setting system described above, as the electric appliance 2 executes S210, even if the MFP 1 fails to receive the advertising packet at a certain timing due to the MFP's reason, after the condition is changed and the MFP 1 becomes ready to receive the advertising packet, the advertising packet can be received by the MFP 1 at that timing. Once the advertising packet is appropriately received, the MFP 1 executes following processes appropriately, and desired changes in settings can be completed without fail.

According to the electric appliance setting system described above, as the MFP 1 executes S325, only for an electric appliance 2 that is not listed in the electric appliance information management table (hereinafter, referred to as a new electric appliance), transmission of the setting sheet data and the following processes are executed. Therefore, different from a case where such processes are executed evenly for all the electric appliances 2, only for the electric appliance 2 whose settings should be changed (i.e., the new electric appliances), the settings can be changed easily. For the electric appliances whose settings may not be necessary (i.e., the electric appliances already listed in the electric appliance information management table), the setting sheet 5 may not be printed unnecessarily.

According to the electric appliance setting system described above, as the MFP 1 executes S325 and S335, when the MFP 1 detects the new electric appliance 2, the electric appliance information on the new electric appliance 2 is stored in the electric appliance information management table. That is, without the user's particular input operation, the contents of the electric appliance information management table can be updated to reflect the latest configuration of the home network.

According to the electric appliance setting system described above, as the MFP 1 executes S510, it is possible to prevent the invalid data from being retained in the electric appliance information management table. Therefore, the storage of the MFP 1 can be used efficiently.

According to the electric appliance setting system described above, as the MFP 1 executes S340, transmission of the setting data and the following processes are executed only for the electric appliances whose settings have not been changed in the past. Therefore, different from a case where such processes are executed evenly for all the electric appliances 2, only for the electric appliance 2 whose settings should be changed, the settings can be changed easily. For the electric appliances whose settings may not be necessary, the setting sheet 5 may not be printed unnecessarily. Further, when a new MFP 1 is connected to the home network to which the electric appliances 2 whose settings have been changed, it is possible to avoid output of the setting sheet 5 for such electric appliances 2 by the new MFP 1.

According to the electric appliance setting system described above, when the electric appliance 2 executes S135, the address that may dynamically change, and the name of the electric appliance 2 that may be changed are incorporated in the tessellated code 11. Therefore, the MFP 1 can transmit the setting data to the intended electric appliance 2 without fail.

It should be noted that the invention needs not be limited to the configuration of the above-described illustrative embodiment, and can be modified in various ways in accordance with aspects of the invention.

In the above-described illustrative embodiment, as the image processing device, the MFP 1 having multiple functions (i.e., scanner function, printer function, copier function, facsimile machine function, telephone function) is described. This is only an illustrative embodiment, and the image processing device may be a device having functions of the scanner and the printer according to aspects of the invention. Therefore, the invention can be applied, for example, to a facsimile machine instead of the MFP.

The setting sheet 5 according to the above-described illustrative embodiment is only an exemplary one, and the format can be change in various ways depending on a setting system.

In the illustrative embodiment, the settings can be made when the new electric appliance is connected to the home network, and when the user inputs instructions to change the settings. This can be modified such that for a low-end system, only one of the two situations, the settings can be changed.

What is claimed is:

1. An electric appliance setting system, comprising: an image processing apparatus with an image scanning system which scans an image formed on an original document and an image printing system which prints an image; at least one electric appliance, which is communicably connected with the image processing apparatus through a network, wherein the image processing apparatus is provided with: a setting sheet print controlling system, which controls the image printing system to form an image of a setting sheet, in which a desired setting of the at least one electric appliance is written, based on setting sheet data transmitted from the at least one electric appliance to the image processing apparatus; and a setting data transmission system, which transmits setting data including one of image data scanned from the setting sheet in which the desired setting is written and data indicating the desired setting to the at least one electric appliance, wherein the at least one electric appliance is provided with: a setting sheet data transmission system which transmits the setting sheet data to the image processing apparatus; and a setting modifying system which modifies a setting of the electric appliance to the desired setting written in the setting sheet when the setting data is transmitted from the image processing apparatus, wherein the image processing apparatus is provided with a setting sheet data requesting system, which requests the at least one electric appliance to transmit the setting sheet data, and wherein the setting sheet data transmission system of the at least one electric appliance transmits the setting sheet data to the image processing apparatus in response to the request from the image processing apparatus, wherein the at least one electric appliance is provided with a presence notifying system which notifies of presence of the at least one electric appliance in the network to the image processing apparatus, and wherein the setting sheet data requesting system of the image processing apparatus requests the at least one electric appliance that has notified of the presence to transmit the setting sheet data in response to the notification of the presence, wherein the image processing apparatus is provided with: an electric appliance data storing system, in which electric appliance data indicating the presence of the at least one electric appliance in the network is stored; and an additional electric appliance judging system, which determines the at least one electric device that has notified of its presence to the image processing apparatus is a newly added electric appliance which is newly connected to the network when the image processing apparatus being notified of the presence of the at least one electric appliance finds no electric appliance data corresponding to the at least one electric appliance that has notified of its presence in the electric appliance data storing system, and wherein the setting sheet data requesting system of the image processing apparatus requests the newly added electric appliance to transmit the setting sheet data when the at least one electric appliance is determined to be the newly added electric appliance by the additional electric appliance judging system.

2. The electric appliance setting system according to claim 1, wherein the presence notifying system of the at least one electric appliance notifies the image processing apparatus of the presence of the at least one electric appliance itself in the network when the at least on electric appliance is powered on.

3. The electric appliance setting system according to claim 1, wherein the presence notifying system of the at least one electric appliance notifies the image processing apparatus of the presence of the at least one electric appliance in the network at a predetermined time interval.

4. The electric appliance setting system according to claim 1, wherein the image processing apparatus is provided with an electric appliance data registering system, which stores the electric appliance data corresponding to the newly added electric appliance in the electric appliance data storing system when the at least one electric appliance is determined to be the newly added electric appliance by the additional electric appliance judging system.

5. The electric appliance setting system according to claim 4, wherein the image processing apparatus is provided with an electric appliance data deleting system, which removes the electric appliance data corresponding to the electric appliance of which the presence in the network is not notified to the image processing apparatus over a predetermined period from the electric appliance data storing system.

6. An electric appliance setting system, comprising: an image processing apparatus with an image scanning system which scans an image formed on an original document and an image printing system which prints an image; at least one electric appliance, which is communicably connected with the image processing apparatus through a network, wherein the image processing apparatus is provided with: a setting sheet print controlling system, which controls the image printing system to form an image of a setting sheet, in which a desired setting of the at least one electric appliance is written, based on setting sheet data transmitted from the at least one electric appliance to the image processing apparatus; and a setting data transmission system, which transmits setting data including one of image data scanned from the setting sheet in which the desired setting is written and data indicating the desired setting to the at least one electric appliance, wherein the at least one electric appliance is provided with: a setting sheet data transmission system which transmits the setting sheet data to the image processing apparatus; and a setting modifying system which modifies a setting of the electric appliance to the desired setting written in the setting sheet when the setting data is transmitted from the image processing apparatus, wherein the image processing apparatus is provided with a setting sheet data requesting system, which requests the at least one electric appliance to transmit the setting sheet data, and wherein the setting sheet data transmission system of the at least one electric appliance transmits the setting sheet data to the image processing apparatus in response to the request from the image processing apparatus, and wherein the at least one electronic appliance is provided with a modification information transmitting system, which transmits modification information indicating as to whether the setting of the at least one electric appliance has been modified before to the image processing apparatus, wherein the image processing apparatus is provided with an unset electric appliance judging system, which determines, based on the modification information transmitted from the at least one electric appliance, the at least one electric appliance of which the setting has not been modified before is an unset electric appliance, and wherein the setting sheet data requesting system of the image processing apparatus requests the unset electric appliance to transmit the setting sheet data when the at least one electric appliance is determined to be the unset electric appliance by the unset electric appliance judging system.

7. An electric appliance setting system, comprising: an image processing apparatus with an image scanning system which scans an image formed on an original document and an image printing system which prints an image; at least one electric appliance, which is communicably connected with the image processing apparatus through a network, wherein the image processing apparatus is provided with: a setting sheet print controlling system, which controls the image printing system to form an image of a setting sheet, in which a desired setting of the at least one electric appliance is written, based on setting sheet data transmitted from the at least one electric appliance to the image processing apparatus; and a setting data transmission system, which transmits setting data including one of image data scanned from the setting sheet in which the desired setting is written and data indicating the desired setting to the at least one electric appliance, wherein the at least one electric appliance is provided with: a setting sheet data transmission system which transmits the setting sheet data to the image processing apparatus; and a setting modifying system which modifies a setting of the electric appliance to the desired setting written in the setting sheet when the setting data is transmitted from the image processing apparatus, wherein the setting sheet data transmission system of the at least one electric appliance transmits the setting sheet data including at least one of an address assigned to the at least one electric appliance in the network and a name identifying the address to the image processing apparatus, and the setting sheet print controlling system of the image processing apparatus controls the image printing system to form the image of the setting sheet including an image indicating one of the address of the at least one electric appliance and the name identifying the address based on the setting sheet when the setting sheet data is transmitted from the at least one electric appliance.

8. An image processing apparatus communicably connected to an electric appliance through a network, comprising: an image scanning system which scans an image formed on an original document; an image printing system which prints an image; a setting sheet print controlling system, which controls the image printing system to form an image of a setting sheet, in which a desired setting of the electric appliance is written, based on setting sheet data transmitted from the electric appliance to the image processing apparatus; and a setting data transmission system, which transmits setting data including one of image data read from the setting sheet in which the desired setting is written and data indicating the desired setting to the at least one electric appliance, wherein the at least one electric appliance is provided with: a setting sheet data transmission system which transmits the setting sheet data to the image processing apparatus; and a setting modifying system which modifies a setting of the electric appliance to the desired setting written in the setting sheet when the setting data is transmitted from the image processing apparatus,
wherein the image processing apparatus is provided with a setting sheet data requesting system, which requests the at least one electric appliance to transmit the setting sheet data, and wherein the setting sheet data transmission system of the at least one electric appliance transmits the setting sheet data to the image processing apparatus in response to the request from the image processing apparatus,
wherein the at least one electric appliance is provided with a presence notifying system which notifies of presence of the at least one electric appliance in the network to the image processing apparatus, and wherein the setting sheet data requesting system of the image processing apparatus requests the at least one electric appliance that has notified of its presence to transmit the setting sheet data in response to the notification of its presence,
wherein the image processing apparatus is provided with: an electric appliance data storing system, in which electric appliance data indicating the presence of the at least one electric appliance in the network is stored; and an additional electric appliance judging system, which determines the at least one electric device that has notified of its presence to the image processing apparatus is a newly added electric appliance which is newly connected to the network when the image processing apparatus being notified of the presence of the at least one electric appliance finds no electric appliance data corresponding to the at least one electric appliance that has notified of its presence in the electric appliance data storing system, and
wherein the setting sheet data requesting system of the image processing apparatus requests the newly added electric appliance to transmit the setting sheet data when the at least one electric appliance is determined to be the newly added electric appliance by the additional electric appliance judging system.

9. A computer usable medium comprising computer readable instructions for controlling a computer which is communicably connected to an electric appliance via a network and has an image scanning system which scans an image formed on an original document and an image printing system which prints an image to execute steps of:
controlling the image printing system to form an image of a setting sheet, in which a desired setting of the at least one electric appliance is written by a user, based on setting sheet data transmitted from the at least one electric appliance to the image processing apparatus, and transmitting setting data including one of image data scanned from the setting sheet in which the desired setting is written by the user and data indicating the desired setting to the at least one electric appliance,
storing an indication of the presence of the at least one electric appliance in the network,
determining that the at least one electric appliance that has notified of its presence to the image processing apparatus is a newly added electric appliance which is newly connected to the network when the image processing apparatus is notified of the presence of the at least one electric appliance finds no electric appliance data corresponding to the at least one electric appliance that has notified of its presence, and
requesting the newly added electric appliance to transmit the setting data when the at least one electric appliance is determined to be the newly added electric appliance.

10. An electric appliance, which is communicably connected to an image processing apparatus having an image scanning system that scans an image formed on an original document and an image printing system that prints an image, comprising: a setting sheet data transmission system which transmits setting sheet data used by the image processing apparatus to form an image of a setting sheet, in which a desired setting of the electric appliance is written to the image processing apparatus; and a setting modifying system which modifies a setting of the electric appliance to the desired setting written in the setting sheet when the setting data including one of data indicating an image scanned from the setting sheet in which the desired setting is written and data indicating the desired setting included in the image scanned from the setting sheet is transmitted from the image processing apparatus, wherein the at least one electric appliance is provided with: a setting sheet data transmission system which transmits the setting sheet data to the image processing apparatus; and a setting modifying system which modifies a setting of the electric appliance to the desired setting written in the setting sheet when the setting data is transmitted from the image processing apparatus, wherein the image processing apparatus is provided with a setting sheet data requesting system, which requests the at least one electric appliance to transmit the setting sheet data, and wherein the setting sheet data transmission system of the at least one electric appliance transmits the setting sheet data to the image processing apparatus in response to the request from the image processing apparatus, wherein the at least one electric appliance is provided with a presence notifying system which notifies of presence of the at least one electric appliance in the network to the image processing apparatus, and wherein the setting sheet data requesting system of the image processing apparatus requests the at least one electric appliance that has notified of its presence to transmit the setting sheet data in response to the notification of the presence, wherein the image processing apparatus is provided with: an electric appliance data storing system, in which electric appliance data indicating the presence of the at least one electric appliance in the network is stored; and an additional electric appliance judging system, which determines the at least one electric device that has notified of its presence to the image processing apparatus is a newly added electric appliance which is newly connected to the network when the image processing apparatus is notified of its presence of the at least one electric appliance finds no electric appliance data corresponding to the at least one electric appliance that has notified of its presence in the electric appliance data storing system, and wherein the setting sheet data requesting system of the image processing apparatus requests the newly added electric appliance to transmit the setting sheet data when the at least one electric appliance is determined to be the newly added electric appliance by the additional electric appliance judging system.

11. A computer usable medium comprising computer readable instructions for controlling a computer which is communicably connected to an electric appliance via a network and has an image scanning system which scans an image formed on an original document and an image printing system which prints an image to execute steps of:

controlling the image printing system to form an image of a setting sheet, in which a desired setting of the at least one electric appliance is written by a user, based on setting sheet data transmitted from the at least one electric appliance to the image processing apparatus, and modifying a setting of the electric appliance to the desired setting written in the setting sheet by the user when the setting data including one of data indicating an image scanned from the setting sheet in which the desired setting is written by the user and data indicating the desired setting included in the image scanned from the setting sheet is transmitted from the image processing apparatus, storing an indication of the presence of the at least one electric appliance in the network, determining that the at least one electric appliance that has notified of its presence to the image processing apparatus is a newly added electric appliance which is newly connected to the network when the image processing apparatus is notified of the presence of the at least one electric appliance finds no electric appliance data corresponding to the at least one electric appliance that has notified of its presence, and requesting the newly added electric appliance to transmit the setting data when the at least one electric appliance is determined to be the newly added electric appliance.

\* \* \* \* \*